(12) United States Patent
Mironov

(10) Patent No.: US 9,532,591 B2
(45) Date of Patent: Jan. 3, 2017

(54) METHOD OF MANUFACTURING A COMBUSTIBLE HEAT SOURCE WITH A BARRIER

(71) Applicant: Philip Morris Products S.A., Neuchatel (CH)

(72) Inventor: Oleg Mironov, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 78 days.

(21) Appl. No.: 14/407,166

(22) PCT Filed: Jun. 13, 2013

(86) PCT No.: PCT/EP2013/062290
§ 371 (c)(1),
(2) Date: Dec. 11, 2014

(87) PCT Pub. No.: WO2013/189836
PCT Pub. Date: Dec. 27, 2013

(65) Prior Publication Data
US 2015/0157051 A1    Jun. 11, 2015

(30) Foreign Application Priority Data

Jun. 21, 2012  (EP) .................... 12172992

(51) Int. Cl.
*A24B 15/16*      (2006.01)
*A24F 47/00*      (2006.01)
*B29C 69/00*      (2006.01)

(52) U.S. Cl.
CPC .......... *A24B 15/165* (2013.01); *A24F 47/004* (2013.01); *A24F 47/006* (2013.01); *B29C 69/005* (2013.01); *Y10T 156/107* (2015.01)

(58) Field of Classification Search
CPC . Y10T 156/107; B29C 69/005; A24B 15/165; A24F 47/004; A24F 47/006
(Continued)

(56) References Cited

U.S. PATENT DOCUMENTS 4,786,342 A * 11/1988 Zellner .................... B28B 3/02
                                                          156/261
4,819,665 A     4/1989 Roberts et al.
(Continued)

FOREIGN PATENT DOCUMENTS

CN         85 1 06876 A     9/1986
CN         1077360 A       10/1993
(Continued)

OTHER PUBLICATIONS

International Search Report and Written Opinion of the International Searching Authority issued Nov. 22, 2013, in PCT/EP2013/062290, filed Jun. 13, 2013.
(Continued)

*Primary Examiner* — Philip Tucker
*Assistant Examiner* — John Blades
(74) *Attorney, Agent, or Firm* — Oblon, McClelland, Maier & Neustadt, L.L.P.

(57) ABSTRACT

There is provided a method of manufacturing a combustible heat source having a barrier affixed to an end face thereof, including providing a hollow die having a first opening and an opposed second opening; covering the first opening with a laminar barrier material; punching a barrier from the laminar barrier material by inserting a first punch into the hollow die through the first opening; placing one or more particulate components in the hollow die through the second opening; compressing the one or more particulate components to form a combustible heat source and affixing the barrier to an end face of the combustible heat source by
(Continued)

Figure 1C:
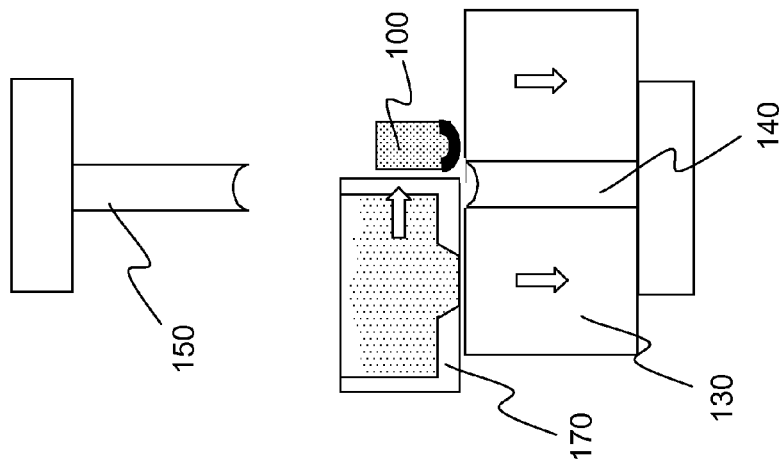

inserting a second punch into the hollow die through the second opening; and ejecting the combustible heat source having the barrier affixed to the end face thereof from the hollow die.

15 Claims, 2 Drawing Sheets

(58) Field of Classification Search
    USPC .......................................................... 156/261
    See application file for complete search history.

(56) References Cited

U.S. PATENT DOCUMENTS

| | | | |
|---|---|---|---|
| 5,027,836 A * | 7/1991 | Shannon | A24F 47/004 131/194 |
| 5,129,409 A | 7/1992 | White et al. | |
| 5,345,955 A | 9/1994 | Clearman et al. | |
| 2009/0065011 A1 | 3/2009 | Maeder et al. | |

FOREIGN PATENT DOCUMENTS

| | | |
|---|---|---|
| CN | 1087497 A | 6/1994 |
| CN | 1529683 A | 9/2004 |
| CN | 1575135 A | 2/2005 |
| CN | 101048083 A | 10/2007 |
| CN | 101778578 A | 7/2010 |
| CN | 102159100 A | 8/2011 |
| EP | 0 174 645 A2 | 3/1986 |
| EP | 0 277 519 A2 | 8/1988 |
| EP | 0 405 190 A2 | 1/1991 |
| EP | 0 588 247 A2 | 3/1994 |
| EP | 2 113 177 A1 | 11/2009 |
| KR | 10-2006-0107546 A | 10/2006 |
| KR | 10-2007-0054249 A | 5/2007 |
| WO | WO 2006/004934 A | 1/2006 |
| WO | 2009/022232 A2 | 2/2009 |

OTHER PUBLICATIONS

Office Action issued Mar. 31, 2016 in Korean Patent Application No. 10-2014-7027764 (with English language translation).
International Search Report Issued Sep. 5, 2013, in PCT/EP2013/055459, filed Mar. 15, 2013.
Office Action Issued Dec. 7, 2015 in Japanese Patent Application No. 2015-503806 (with English language translation).
Combined Chinese Office Action and Search Report Issued Oct. 28, 2015 in Patent Application No. 201380026301.5 (with English language translation).
Chinese Office Action and Search Report Issued Jun. 3, 2016 in Patent Application No. 201380038772.8 (with English language translation).

* cited by examiner

METHOD OF MANUFACTURING A COMBUSTIBLE HEAT SOURCE WITH A BARRIER

CROSS REFERENCE TO RELATED APPLICATION

This application is a national phase application based on PCT/EP2013/062290, filed on Jun. 13, 2013.

The invention relates to a method of manufacturing a combustible heat source having a barrier affixed to an end face thereof.

A number of smoking articles in which tobacco is heated rather than combusted have been proposed in the art. One aim of such 'heated' smoking articles is to reduce known harmful smoke constituents of the type produced by the combustion and pyrolytic degradation of tobacco in conventional cigarettes.

In one known type of heated smoking article, an aerosol is generated by the transfer of heat from a combustible heat source to an aerosol-forming substrate located downstream of the combustible heat source. During smoking, volatile compounds are released from the aerosol-forming substrate by heat transfer from the combustible heat source and entrained in air drawn through the smoking article. As the released compounds cool, they condense to form an aerosol that is inhaled by the user.

For example, WO-A2-2009/022232 discloses a smoking article comprising a combustible heat source, an aerosol-forming substrate downstream of the combustible heat source, and a heat-conducting element around and in direct contact with a rear portion of the combustible heat source and an adjacent front portion of the aerosol-forming substrate.

The combustible heat sources of heated smoking articles may comprise one or more additives to aid ignition or combustion of the combustible heat source or a combination thereof. To facilitate aerosol formation, the aerosol-forming substrates of heated smoking articles typically comprise a polyhydric alcohol such as glycerine or other aerosol-former.

A barrier may be provided between a downstream end of the combustible heat source and an upstream end of the aerosol-forming substrate of a heated smoking article.

The barrier may prevent or inhibit migration of the aerosol-former from the aerosol-forming substrate to the combustible heat source during storage and use of the heated smoking article, and so avoid or reduce decomposition of the aerosol-former during use of the heated smoking article. The barrier may also limit or prevent migration of other volatile components of the aerosol-forming substrate from the aerosol-forming substrate to the combustible heat source during storage and during use of smoking articles according to the invention.

Alternatively or in addition, the barrier may limit the temperature to which the aerosol-forming substrate is exposed during ignition or combustion of the combustible heat source, and so help to avoid or reduce thermal degradation or combustion of the aerosol-forming substrate during use of the heated smoking article.

Alternatively or in addition, the barrier may prevent or inhibit combustion and decomposition products formed during ignition and combustion of the combustible heat source from entering air drawn through the heated smoking article during use thereof. This is particularly advantageous where the combustible heat source comprises one or more additives to aid ignition or combustion of the combustible heat source or a combination thereof.

According to the invention, there is provided a method of manufacturing a combustible heat source having a barrier affixed to an end face thereof. The method comprises providing a hollow die having a first opening and an opposed second opening, covering the first opening of the hollow die with a laminar barrier material, punching a barrier from the laminar barrier material by inserting a first punch into the hollow die through the first opening, placing one or more particulate components in the hollow die through the second opening, compressing the one or more particulate components to form a combustible heat source and affix the barrier to an end face of the combustible heat source by inserting a second punch into the hollow die through the second opening, and ejecting the combustible heat source having the barrier affixed to the end face thereof from the hollow die.

The barrier punched from the laminar barrier material prevents direct contact between the first punch inserted into the hollow die through the first opening and the one or more particulate components placed in the hollow die through the second opening. This advantageously eliminates or reduces the potential for the one or more particulate components to adhere to the first punch. As described below, this is particularly beneficial where the one or more particulate components comprise a binder.

Reducing or preventing deposition and build up of the one or more particulate components on the first punch advantageously improves the quality of combustible heat sources made by the method of the invention.

As used herein, the term 'particulate component' is used to describe any flowable particulate material or combination of particulate materials including, but not limited to, powders and granules. Particulate components used in methods according to the invention may comprise two or more particulate materials of different types. Alternatively or in addition, particulate components used in methods according to the invention may comprise two or more particulate materials of different composition.

As used herein, the term 'different composition' is used to refer to materials or components formed from different compounds, or from a different combination of compounds, or from a different formulation of the same combination of compounds.

The method of the invention may be used to manufacture combustible carbonaceous heat sources having a barrier affixed to an end face thereof. In such embodiments, at least one of the one or more particulate components placed in the hollow die through the second opening is carbonaceous.

As used herein, the term 'carbonaceous' is used to describe combustible heat sources, particulate components and particulate materials comprising carbon.

The method of the invention may comprise placing one or more carbonaceous particulate components in the hollow die through the second opening.

Alternatively or in addition, the method of the invention may comprise placing one or more non-carbonaceous particulate components in the hollow die through the second opening.

Carbonaceous particulate components for use in the method of the invention may be formed from one or more suitable carbon-containing materials.

The method of the invention may advantageously be used to manufacture combustible heat sources having barriers affixed to the end face thereof for use in the manufacture of smoking articles comprising a combustible heat source, an aerosol-forming substrate downstream of the combustible heat source and a barrier between the downstream end of the combustible heat source and the upstream end of the aerosol-forming substrate.

As used herein, the terms 'upstream' and 'front', and 'downstream' and 'rear', are used to describe the relative positions of portions, components, or portions of components, of combustible heat sources and smoking articles in relation to the direction of air drawn through the combustible heat sources and smoking articles during use thereof.

As used herein, the term 'aerosol-forming substrate' is used to describe a substrate capable of releasing upon heating volatile compounds, which can form an aerosol.

Smoking articles comprising combustible heat sources having a barrier affixed to an end face thereof manufactured by the method of the invention preferably further comprise a heat-conducting element around and in contact with a rear portion of the combustible heat source and an adjacent front portion of the aerosol-forming substrate. The heat-conducting element is preferably combustion resistant and oxygen restricting.

Smoking articles comprising combustible heat sources having a barrier affixed to an end face thereof manufactured by the method of the invention may further comprise one or both of an expansion chamber and a mouthpiece downstream of the aerosol-forming substrate.

Preferably, the laminar barrier material is non-combustible. As used herein, the term 'non-combustible' is used to describe a barrier material that is substantially non-combustible at temperatures reached by the combustible heat source during combustion or ignition thereof.

Preferably, the laminar barrier material is substantially air-impermeable. As used herein, the term 'substantially air-impermeable' is used to describe a barrier material that substantially prevents air from being drawn through the end face of the combustible heat source to which the barrier is affixed.

The laminar barrier material may have a low thermal conductivity or a high thermal conductivity. In certain embodiments, the laminar barrier material may have a thermal conductivity of between about 0.1 W/m·K and about 200 W/m·K. Preferably, the thermal conductivity of the laminar barrier material is at least about 200 W/m·K.

The thickness of the laminar barrier material may be selected to achieve good smoking performance when the combustible heat source having the barrier affixed to the end face thereof is used in a smoking article. In certain embodiments, the laminar barrier material may have a thickness of between about 10 microns and about 500 microns. Preferably, the thickness of the laminar barrier material is between about 10 microns and about 30 microns, more preferably about 20 microns.

The thickness of the laminar barrier material may be measured using a microscope, a scanning electron microscope (SEM) or other suitable measurement methods known in the art.

The laminar barrier material may be formed from any suitable material or combination of materials that are substantially thermally stable at temperatures achieved by the combustible heat source during ignition and combustion and are capable of being punched to form a barrier.

Preferred materials from which the laminar barrier material may be formed include, but are not limited to: copper; aluminium; stainless steel; and alloys. Most preferably, the laminar barrier material is formed from aluminium. In a particularly preferred embodiment, the barrier material is formed from >99% pure Aluminium EN AW 1200, or EN AW 8079 alloy.

Preferably, the barrier extends across substantially the entire end face of the combustible heat source.

More preferably, the barrier extends across substantially the entire end face of the combustible heat source and at least partially along an adjacent side of the combustible heat source. In such embodiments, the barrier forms a 'convex cap' that covers the end of the combustible heat source. This advantageously increases the structural rigidity of the periphery of the end face of the combustible heat source covered by the 'cap'. It also advantageously reduces the risk of fragmentation of the combustible heat source along the interface between the barrier and the combustible heat source.

In certain embodiments, the barrier extends along the adjacent side of the combustible heat source for a distance of less than about five times the thickness of the laminar barrier material, more preferably less than about three times the thickness of the laminar barrier material.

The profile of the first punch and the second punch may be the same or different.

One or both of the first punch and the second punch may have a concave profile.

Alternatively, one or both of the first punch and the second punch may have a flat profile.

In certain preferred embodiments, the first punch has a concave profile. The use of a first punch having a concave profile may help to form rounded or truncated edges about the periphery of the end face of the combustible heat source to which the barrier is affixed.

Use of a first punch having a concave profile advantageously may reduce the risk of formation of an air lock between the barrier and the end face of the combustible heat source to which the barrier is attached. Use of a first punch having a concave profile also advantageously helps the barrier to form a convex cap that covers the end of the combustible heat source.

In embodiments where the first punch has a concave profile, the first punch may have a concave profile having a depth of between about 0.25 mm and about 1 mm, more preferably of between about 0.4 mm and about 0.6 mm.

In embodiments where the first punch has a concave profile, the first punch may have a concave profile having a chamfered edge at an angle of between about 30 degrees and about 80 degrees.

In other preferred embodiments, the first punch has a flat profile.

In certain preferred embodiments, the second punch has a concave profile. The use of a second punch having a concave profile may help to form rounded or truncated edges about the periphery of an end face of the combustible heat source opposed to the face of the combustible heat source to which the barrier is affixed.

The use of a second punch having a concave profile may also advantageously reduce friction between the second punch and the hollow die by substantially preventing the build-up of particulate material between the second punch and the hollow die; in effect, the second punch acts as a scraper.

In embodiments where the second punch has a concave profile, the second punch may have a concave profile having a depth of between about 0.25 mm and about 1 mm, more preferably of between about 0.4 mm and about 0.6 mm.

In embodiments where the second punch has a concave profile, the second punch may have a concave profile having a chamfered edge at an angle of between about 30 degrees and about 80 degrees.

Preferably, the hollow die, the first punch, and the second punch are cylindrical and of corresponding substantially circular cross-section. Alternatively, the hollow die, the first punch, and the second punch may be cylindrical and of corresponding substantially elliptical cross-section.

Preferably, the first punch is a lower punch and the second punch is an upper punch. In such embodiments, the barrier is punched from the laminar barrier material by inserting the lower punch upwardly into the hollow die through the first opening, which is located at a lower end of the hollow die. The one or more particulate components are then compressed to form the combustible heat source and affix the barrier to the end face of the combustible heat source by inserting the upper punch downwardly into the hollow die through the second opening, which is located at an upper end of the hollow die.

Preferably, the method comprises ejecting the manufactured combustible heat source having the barrier affixed to the end face thereof from the hollow die through the second opening.

In certain embodiments, the method may comprise ejecting the manufactured combustible heat source having the barrier affixed to the end face thereof from the hollow die through the second opening by removing the second punch from the hollow die through the second opening and moving the first punch within the hollow die towards the second opening.

Where the first punch is a lower punch and the second punch is an upper punch, preferably the method comprises ejecting the manufactured combustible heat source having the barrier affixed to the end face thereof from the hollow die through the second opening located at the upper end of the die by removing the upper punch from the hollow die through the second opening and moving the lower punch upwardly within the hollow die towards the second opening.

In other embodiments, the method may comprise ejecting the manufactured combustible heat source having the barrier affixed to the end face thereof from the hollow die through the second opening by removing the second punch from the hollow die through the second opening and moving the hollow die towards the first punch.

Preferably, the method comprises placing the one or particulate components in the hollow die through the second opening using a gravity fed hopper. In certain embodiments, the method comprises advancing the hopper over the second opening in order to place the one or more particulate components in the hollow die through the second opening thereof and then retracting the hopper from the second opening of the hollow die.

In certain embodiments, the method may comprise using the hopper to remove a previously manufactured combustible heat source having a barrier affixed to the end face thereof that has been ejected from the hollow die through the second opening during the step of advancing the hopper over the second opening of the hollow die.

In certain embodiments, the hopper may comprise an outlet for dispensing the one or more particulate components that is substantially sealed against the hollow die until the outlet is over the second opening.

As used herein, the term 'sealed' is used to mean that particulate matter contained in the hopper is prevented from exiting the hopper through the outlet.

Preferably, the method comprises covering the first opening with a continuous laminar barrier material. Preferably, the continuous laminar barrier material has a width of between about 1.5 times and about 3 times the width of the hollow die.

In order to cover the first opening with the continuous laminar barrier material, the method may comprise feeding the continuous laminar material in a direction substantially parallel to the direction in which the hopper is advanced and retracted.

However, the method may comprise feeding the continuous laminar material in a direction substantially perpendicular to the direction in which the hopper is advanced and retracted.

Preferably, the method comprises restraining the laminar barrier material adjacent the hollow die during the step of punching the laminar barrier material. This advantageously improves the quality of the barrier formed by punching the laminar barrier material.

Preferably, the step of restraining the laminar barrier material comprises using a plate, which comprises a through hole for receiving the first punch, to press the laminar barrier material against the hollow die adjacent the second opening thereof.

To allow the simultaneous manufacture of multiple combustible heat sources having barriers affixed to the end faces thereof, the method may comprise providing a plurality of hollow dies each provided with a corresponding first punch and a corresponding second punch.

The plurality of hollow dies may be provided in a single row or in multiple rows.

Alternatively, the method of the invention may be carried out using a continuously rotating multi-cavity or so-called 'turret press'. In such embodiments, multiple hollow dies are rotated about a central axis and one or more particulate components are placed into the hollow dies through the second openings thereof using a hopper. The laminar barrier material is then provided, adjacent the hollow die, to cover the first opening, the laminar barrier material being fed substantially tangentially to the rotating multi-cavity press. The first punch is provided vertically below the laminar barrier material, and during the step of punching the laminar barrier material, the first punch is angularly stationary relative to the hollow die into which it is being inserted. The formed combustible heat source having a barrier is then ejected from the hollow die.

In a preferred embodiment, the method of the invention further comprises providing an adhesive between the barrier and the end face of the combustible heat source. The provision of an adhesive between the barrier and the end face of the combustible heat source advantageously helps to affix the barrier to the end face of the combustible heat source.

In a preferred embodiment, the adhesive is applied to the laminar barrier material prior to covering the first opening of the die with the laminar barrier material.

The adhesive may be applied to the laminar barrier material using any suitable means including, but not limited to, a spray gun, a roller, a slot gun or a combination thereof.

In a particularly preferred embodiment, the method of the invention comprises covering the first opening of the hollow die with a laminar barrier material to which an adhesive has been pre-applied.

The adhesive may be any suitable adhesive capable of permanently affixing the barrier to the end face of the combustible heat source. The adhesive is preferably able to withstand temperatures reached by the combustible heat source during combustion or ignition thereof.

Preferably, the adhesive is a PVA (polyvinyl acetate) adhesive.

Preferably, at least one of the one or more particulate components comprises a binder.

The one or more particulate components may comprise one or more organic binders, one or more inorganic binders or a combination of one or more organic binders and one or more inorganic binders.

Suitable organic binders include but are not limited to: gums, such as, for example, guar gum; modified celluloses and cellulose derivatives such as, for example, methyl cellulose, carboxymethyl cellulose, hydroxypropyl cellulose and hydroxypropyl methylcellulose; flours; starches; sugars; vegetable oils; and combinations thereof.

Suitable inorganic binders include but are not limited to: clays such as, for example, bentonite and kaolinite; alumino-silicate derivatives such as, for example, cement; alkali activated alumino-silicates; alkali silicates such as, for example, sodium silicates and potassium silicates; limestone derivatives such as, for example, lime and hydrated lime; alkaline earth compounds and derivatives such as, for example, magnesia cement, magnesium sulfate, calcium sulfate, calcium phosphate and dicalcium phosphate; aluminium compounds and derivatives such as, for example, aluminium sulphate and combinations thereof.

In certain embodiments, the one or more binders may help to affix the barrier to the end face of the combustible heat source. In such embodiments, an adhesive may or may not be provided between the barrier and the end face of the combustible heat source.

Where methods according to the invention are used to make combustible carbonaceous heat sources, instead of, or in addition to, one or more binders the one or more particulate components may comprise one or more additives in order to improve the properties of the combustible carbonaceous heat source. Suitable additives include, but are not limited to, additives to promote consolidation of the combustible carbonaceous heat source (for example, sintering aids), additives to promote ignition of the combustible carbonaceous heat source (for example, oxidisers such as perchlorates, chlorates, nitrates, peroxides, permanganates, zirconium and combinations thereof), additives to promote combustion of the combustible carbonaceous heat source (for example, potassium and potassium salts, such as potassium citrate) and additives to promote decomposition of one or more gases produced by combustion of the combustible carbonaceous heat source (for example catalysts, such as CuO, $Fe_2O_3$ and $Al_2O_3$).

Where methods according to the invention are used to make combustible carbonaceous heat sources, preferably at least one of the one or more particulate components comprises an ignition aid. In certain embodiments, at least one of the one or more particulate components may comprise carbon and an ignition aid.

As used herein, the term 'ignition aid' is used to denote a material that releases one or both of energy and oxygen during ignition of the combustible carbonaceous heat source, where the rate of release of one or both of energy and oxygen by the material is not ambient oxygen diffusion limited. In other words, the rate of release of one or both of energy and oxygen by the material during ignition of the combustible carbonaceous heat source is largely independent of the rate at which ambient oxygen can reach the material. As used herein, the term 'ignition aid' is also used to denote an elemental metal that releases energy during ignition of the combustible carbonaceous heat source, wherein the ignition temperature of the elemental metal is below about 500° C. and the heat of combustion of the elemental metal is at least about 5 kJ/g.

As used herein, the term 'ignition aid' does not include alkali metal salts of carboxylic acids (such as alkali metal citrate salts, alkali metal acetate salts and alkali metal succinate salts), alkali metal halide salts (such as alkali metal chloride salts), alkali metal carbonate salts or alkali metal phosphate salts, which are believed to modify carbon combustion. Even when present in a large amount relative to the total weight of a combustible carbonaceous heat source, such alkali metal burn salts do not release enough energy during ignition of a combustible carbonaceous heat source to produce an acceptable aerosol during early puffs.

Examples of suitable ignition aids include, but are not limited to: energetic materials that react exothermically with oxygen upon ignition of the combustible carbonaceous heat sources such as, for example, aluminium, iron, magnesium and zirconium; thermites or thermite composites comprising a reducing agent such as, for example, a metal, and an oxidizing agent such as, for example, a metal oxide, that react with one another to release energy upon ignition of the combustible carbonaceous heat source; materials that undergo exothermic reactions upon ignition of the combustible heat source such as, for example, intermetallic and bi-metallic materials, metal carbides and metal hydrides; and oxidizing agents that decompose to release oxygen upon ignition of the combustible carbonaceous heat sources.

Examples of suitable oxidizing agents include, but are not limited to: nitrates such as, for example, potassium nitrate, calcium nitrate, strontium nitrate, sodium nitrate, barium nitrate, lithium nitrate, aluminium nitrate and iron nitrate; nitrites; other organic and inorganic nitro compounds; chlorates such as, for example, sodium chlorate and potassium chlorate; perchlorates such as, for example, sodium perchlorate; chlorites; bromates such as, for example, sodium bromate and potassium bromate; perbromates; bromites; borates such as, for example, sodium borate and potassium borate; ferrates such as, for example, barium ferrate; ferrites; manganates such as, for example, potassium manganate; permanganates such as, for example, potassium permanganate; organic peroxides such as, for example, benzoyl peroxide and acetone peroxide; inorganic peroxides such as, for example, hydrogen peroxide, strontium peroxide, magnesium peroxide, calcium peroxide, barium peroxide, zinc peroxide and lithium peroxide; superoxides such as, for example, potassium superoxide and sodium superoxide; iodates; periodates; iodites; sulphates; sulfites; other sulfoxides; phosphates; phospinates; phosphites; and phosphanites.

The method of the invention may be used to manufacture combustible heat sources that are blind or non-blind.

As used herein, the term 'blind' is used to describe a combustible heat source that does not comprise any airflow channels extending along the length of the combustible heat source through which air may be drawn.

As used herein, the term 'non-blind' is used to describe a combustible heat source comprising one or more airflow channels extending along the length of the combustible heat source through which air may be drawn.

The method of the invention may be used to manufacture combustible heat sources comprising a single layer. Alternatively, the method of the invention may be used to manufacture multilayer combustible heat sources comprising a plurality of layers.

For example, to manufacture a bilayer combustible heat source, the method of the invention may comprise placing a first particulate component and a second particulate component in the hollow die through the second opening thereof and compressing the first particulate component to form a first layer of the bilayer combustible heat source and compressing the second layer to form a second layer of the bilayer combustible heat source.

As used herein, the terms 'layer' and 'layers' are used to refer to distinct portions of multilayer combustible heat sources manufactured by the method of the invention that meet one another along interfaces. Use of the terms 'layer' and 'layers' is not limited to distinct portions of multilayer combustible heat sources manufactured by the method of the invention having any particular absolute or relative dimensions. In particular, layers of multilayer articles manufactured by the method of the invention may be laminar or non-laminar.

Preferably, combustible heat sources manufactured by the method of the invention have an apparent density of between about 0.8 g/cm$^3$ and about 1.1 g/cm$^3$.

Preferably, combustible heat sources manufactured by the method of the invention have a mass of between about 300 mg and about 500 mg, more preferably of between about 400 mg and about 450 mg.

Preferably, combustible heat sources manufactured by the method of the invention are elongate. More preferably, combustible heat sources manufactured by the method of the invention are substantially rod-shaped.

In particularly preferred embodiments, combustible heat sources manufactured by the method of the invention are substantially cylindrical. For example, the method of the invention may be used to manufacture cylindrical combustible heat sources of substantially circular cross-section or of substantially elliptical cross-section.

Preferably, combustible heat sources manufactured by the method of the invention have a length of between about 2 mm and about 20 mm, more preferably of between about 3 mm and about 15 mm, most preferably of between about 9 mm and about 11 mm.

As used herein, the term 'length' denotes the maximum dimension in the longitudinal direction of combustible heat sources manufactured by the method of the invention.

Preferably, combustible heat sources manufactured by the method of the invention have a diameter of between about 5 mm and about 10 mm, more preferably of between about 7 mm and about 8 mm, most preferably of about 7.8 mm.

As used herein, the term 'diameter' denotes the maximum transverse dimension of combustible heat sources manufactured by the method of the invention.

Preferably, combustible heat sources manufactured by the method of the invention are of substantially uniform diameter. However, the method of the invention may alternatively be used to manufacture combustible heat sources that are tapered such that the diameter of a first end of the combustible heat source is greater than the diameter of an opposed second end thereof. For example, the method of the invention may be used to manufacture combustible heat sources that are tapered such that the diameter of the end face of the combustible heat source to which the barrier is affixed is greater that the diameter of an opposed end face of the combustible heat source.

Figure 1B:
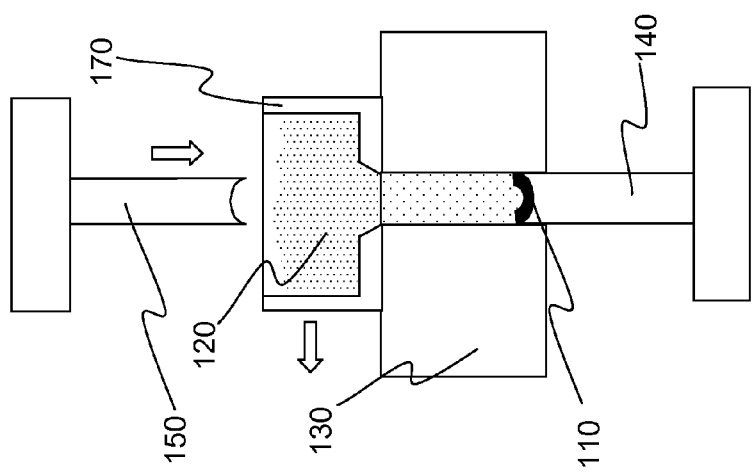
Figure 1A:
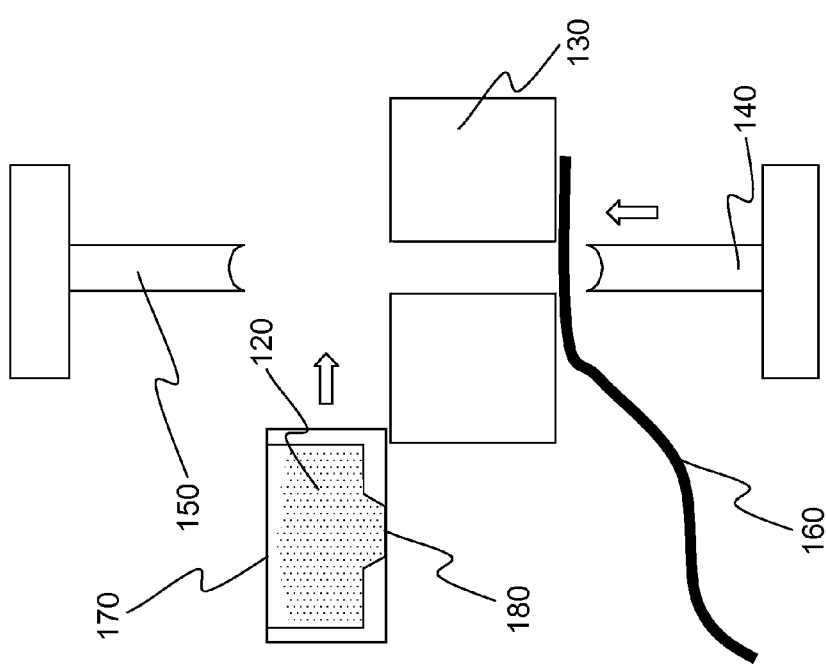
Figure 2A:
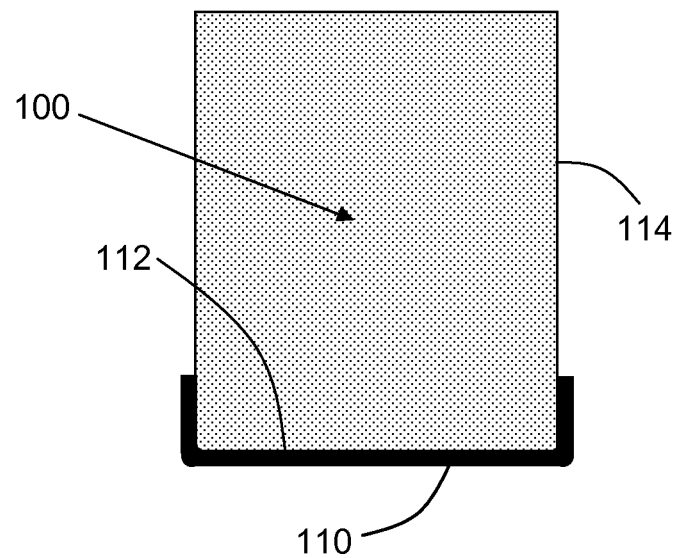

The invention will be further described, by way of example only, with reference to the accompanying drawings in which:

FIGS. 1(a), 1(b) and 1(c) show schematic representations of the manufacture of a combustible heat source having a barrier affixed to an end face thereof by a method according to the invention; and FIGS. 2(a) and (2b) show a schematic longitudinal cross section and a top view of a combustible heat source having a barrier affixed to the end face thereof manufactured by a method according to the invention.

In brief, a cylindrical combustible heat source 100 of substantially circular cross-section having a non-combustible and substantially air-impermeable barrier 110 affixed to an end face 112 thereof is manufactured by compressing a carbonaceous particulate component 120 comprising carbon and a binder, such as gum, is manufactured using a die set comprising a hollow die 130 having open lower and upper ends, a lower punch 140 and an upper punch 150.

The barrier 110 is formed by punching a continuous laminar barrier material 160 with the lower punch 140. The particulate component 120 is then placed into the hollow cylindrical die 130 through the open upper end thereof and compressed using the upper punch 150 to form the combustible heat source 100 and affix the barrier 110 to the end face 112 of the combustible heat source 100.

The die set used to manufacture the combustible heat source is arranged as follows. The lower punch 140 is provided vertically below the hollow die 130 and is arranged such that the longitudinal axis of the lower punch 140 and the longitudinal axis of the hollow die 130 are aligned. The upper punch 150 is provided vertically above the hollow die 130 and is arranged such that the longitudinal axis of the upper punch 150 and the longitudinal axis of the hollow die 130 are aligned. The lower punch 140 and upper punch 150 are moveable relative to the hollow die in a direction parallel to the longitudinal axes thereof.

A hopper 170 containing a supply of the particulate component 120 and having an outlet 180 is provided vertically above the hollow die 130. The hopper 170 is moveable relative to the hollow die 130 in a direction perpendicular to the longitudinal axis of the hollow die 130

FIG. 1(a) shows the lower punch 130, the upper punch 150 and the hopper 170 retracted from the hollow die 130. The continuous laminar barrier material 160 is fed from a bobbin (not shown) between the lower punch 140 and the hollow die 130 to cover the lower open end of the hollow cavity 130. To help affix the barrier 110 to the end face 112 of the combustible heat source 100, an adhesive (not shown) is provided on the surface of the laminar barrier material 160 facing the hollow die 130.

To form the barrier 110, the lower punch 140 is advanced upwardly towards the hollow die 130 in the direction shown by the arrow in FIG. 1 (a). To ensure that the continuous laminar barrier material 160 is in the correct position for punching to form the barrier 110, it is restrained by a plate (not shown) attached to the lower punch 140. As the lower punch advances upwardly towards the hollow die, the plate engages the laminar barrier material 160 and restrains it over the open lower end of the hollow die 130. Once it engages the laminar barrier material 160, the plate stops moving relative to the hollow die 130, and the lower punch 140 continues to advance upwardly, moving relative to the plate and the hollow die 130. As the lower punch enters the hollow die 130 through the lower open end thereof it punches a barrier 110 from the continuous laminar barrier material 160. As shown in FIG. 1 (a), the lower punch 140 optionally has a concave cross-sectional profile. This facilitates cutting of the continuous laminar barrier material 160 by the lower punch 140; in effect, the concave profile provides a knifelike edge to the lower punch 140 to enable the continuous laminar barrier material 160 to be cut more easily to form the barrier 110. During formation of the barrier 110, the hopper is advanced towards the open upper end of the hollow die 130 in the direction shown by the arrow in FIG. 1 (*a*).

FIG. 1(*b*) shows the hopper 170 positioned such that the outlet 180 is located over the open upper end of the hollow die 130. In this position, the hopper dispenses a portion of the supply of the particulate component 120 contained therein into the hollow die 130. A sufficient quantity of the particulate component 120 is placed into the hollow die 130 through the open upper end thereof to form a single combustible heat source 100.

Once the hopper 170 has dispensed a sufficient quantity of the particulate component 120 has been dispensed into the hollow die 130 it retreats moves away from the hollow die 130 in the direction shown by the arrow in FIG. 1 (*b*). As the hopper 160 moves away from the open upper end of the hollow die 130, the upper punch 150 advances downwardly towards the open upper end of the hollow cavity 130 in the direction shown by the arrow in FIG. 1 (*b*).

As the upper punch 150 enters the hollow die 130 through the upper open end thereof it compresses the particulate material 120 in the hollow die to form the combustible heat source 100 and affix the barrier 110 to the end face 112 of the combustible heat source 110. As shown in FIG. 1 (*a*), the upper punch 150 optionally has a concave cross-sectional profile. This moves the particulate component 120 away from the interface between the upper punch 150 and the hollow die 130 and so reduces friction between the upper punch 150 and the hollow die 130 as the upper punch is inserted into the hollow die 130 through the open upper end thereof; in effect, the concave profile acts as a scraper along the inside of the hollow die. Once the compressing step is complete, the punch retreats vertically.

FIG. 1(*c*) shows the upper punch 150 retreating. As the upper punch 150 retreats the hollow die 130 is lowered relative to the lower punch 140. In this way, the manufactured combustible heat source 100 having the barrier 110 affixed to the end face 112 thereof is ejected from the hollow die 130. As the hollow die 130 is lowered, the hopper is advanced across the top face of the hollow die 130. As the hopper advances, the leading edge of the hopper clears the ejected manufactured combustible heat source 100 having the barrier 110 affixed to the end face 112 thereof from the work area. In this way, a continuous process is provided.

Figure 2B:
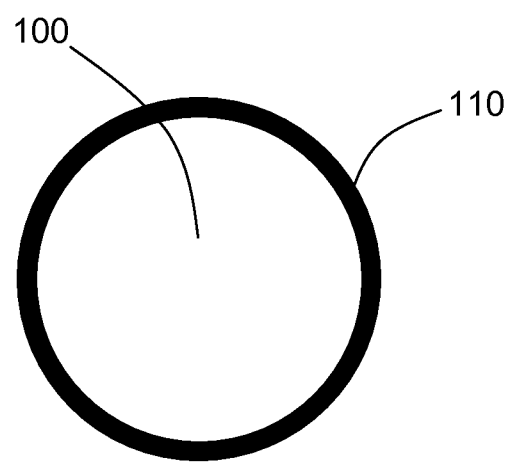

FIGS. 2(*a*) and 2(*b*) show the manufactured combustible heat source 100 having the barrier 110 affixed to the end face 112 thereof. As can be seen, the barrier extends across the entire end face 112 of the combustible heat source 100 and partially along the adjacent side 114 of the combustible heat source 100, forming a 'convex cap' that covers the end of the combustible heat source 100. The shape of the convex cap substantially matches the shape of the concave profile of the lower punch 140.

The specific embodiments and examples described above illustrate but do not limit the invention. It is to be understood that other embodiments of the invention may be made and the specific embodiments and examples described herein are not limiting.

The invention claimed is:

1. A method of manufacturing a combustible heat source having a barrier affixed to an end face thereof, comprising:
    providing a hollow die having a first opening and an opposed second opening;
    covering the first opening of the hollow die with a laminar barrier material;
    punching a barrier from the laminar barrier material by inserting a first punch into the hollow die through the first opening;
    placing one or more particulate components in the hollow die through the second opening;
    compressing the one or more particulate components to form a combustible heat source and affixing the barrier to an end face of the combustible heat source by inserting a second punch into the hollow die through the second opening; and
    ejecting the combustible heat source having the barrier affixed to the end face thereof from the hollow die.

2. The method according to claim 1, further comprising providing an adhesive between the barrier and the end face of the combustible heat source.

3. The method according to claim 2, wherein the adhesive is applied to the laminar barrier material prior to covering the first opening of the die with the laminar barrier material.

4. The method according to claim 3, further comprising applying the adhesive to the laminar barrier material using at least one of a spray gun, a roller, and a slot gun.

5. The method according to claim 1, wherein at least one of the one or more particulate components is carbonaceous.

6. The method according to claim 1, wherein at least one of the one or more particulate components comprises a binder.

7. The method according to claim 6, wherein the binder helps to affix the barrier to the end face of the combustible heat source.

8. The method according to claim 1, wherein the barrier extends across substantially the entire end face of the combustible heat source and at least partially along an adjacent side of the combustible heat source.

9. The method according to claim 1, wherein the first punch has a flat profile or a concave profile.

10. The method according to claim 1, wherein the second punch has a flat profile or a concave profile.

11. The method according to claim 1, wherein the laminar barrier material is heat conductive.

12. The method according to claim 10, wherein the thermal conductivity of the laminar barrier material is at least about 200 W/m·K.

13. The method according to claim 1, wherein the laminar barrier material is non-combustible.

14. The method according to claim 1, wherein the laminar barrier material is substantially air-impermeable.

15. A method for manufacturing a smoking article having a combustible heat source, the combustible heat source having a barrier affixed to an end face thereof, the method comprising:
    providing a hollow die having a first opening and an opposed second opening;
    covering the first opening of the hollow die with a laminar barrier material;
    punching a barrier from the laminar barrier material by inserting a first punch into the hollow die through the first opening;
    placing one or more particulate components in the hollow die through the second opening;
    compressing the one or more particulate components to form a combustible heat source and affixing the barrier to an end face of the combustible heat source by inserting a second punch into the hollow die through the second opening;
    ejecting the combustible heat source having the barrier affixed to the end face thereof from the hollow die; and providing the combustible heat source as part of the smoking article.

* * * * *